US006817173B2

United States Patent
Paffrath et al.

(10) Patent No.: US 6,817,173 B2
(45) Date of Patent: Nov. 16, 2004

(54) METHOD AND DEVICE FOR SIMULTANEOUS REGULATION OF AN INTAKE AIR FLOW FOR AN INTERNAL COMBUSTION ENGINE AND A SECONDARY AIR FLOW IN THE EXHAUST SYSTEM OF THE SAME INTERNAL COMBUSTION ENGINE

(75) Inventors: Holger Paffrath, Pulheim (DE); Karl Ernst Hummel, Bietigheim-Bissingen (DE); Jochem Fischer, Marbach (DE)

(73) Assignee: Filterwork Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/203,455

(22) PCT Filed: Jan. 19, 2001

(86) PCT No.: PCT/EP01/00603

§ 371 (c)(1),
(2), (4) Date: Nov. 22, 2002

(87) PCT Pub. No.: WO01/59273

PCT Pub. Date: Aug. 16, 2001

(65) Prior Publication Data

US 2003/0167751 A1 Sep. 11, 2003

(30) Foreign Application Priority Data

Feb. 10, 2000 (DE) ......................................... 100 05 888

(51) Int. Cl.[7] .............................. F01N 3/00; F01N 3/32
(52) U.S. Cl. ............................. 60/293; 60/289; 60/290; 60/307; 60/396; 60/397
(58) Field of Search .......................... 60/289, 290, 293, 60/307, 396, 397

(56) References Cited

U.S. PATENT DOCUMENTS 3,299,629 A   1/1967   Bouchard .................... 60/397

(List continued on next page.)

FOREIGN PATENT DOCUMENTS

DE      1476578        9/1970

(List continued on next page.)

OTHER PUBLICATIONS

Search Report.

*Primary Examiner*—Sheldon J Richter
(74) *Attorney, Agent, or Firm*—Crowell & Moring LLP

(57) ABSTRACT

A method and an apparatus are described for the simultaneous adjustment of an air intake stream 24 of an internal combustion engine 10 and of a secondary air stream 21 into the exhaust system 12 of the internal combustion engine, the secondary air stream being produced by a compressor 20 which is driven by a turbine 18. The turbine 18 is housed in a bypass duct 16, the bypass duct being arranged parallel to a throttle valve 14 in the air intake tract 11 of the internal combustion engine. Thus the required amount of secondary air 21 is dependent upon the throttle valve setting. To create compensation for this, a control valve 32, for example, is created, which is connected through a connecting duct 4 to the secondary air duct 22. The control valve affects the cross section of the bypass line 16, so that in the event of an opening of the throttle valve 14 the cross section of the bypass duct can be expanded simultaneously, so that the pressure drop at the turbine, produced by throttle valve opening can be compensate. Alternatively the arrangement of a control valve is possible, which is operated by a control unit. Moreover, a mechanical coupling of the throttle means in the bypass line and the throttle valve is possible. The proposed method achieves the simultaneous adjustment of air intake flow and secondary air flow with reasonable design expense and therefore constitutes an economical solution.

10 Claims, 2 Drawing Sheets

U.S. PATENT DOCUMENTS

Figure 1:
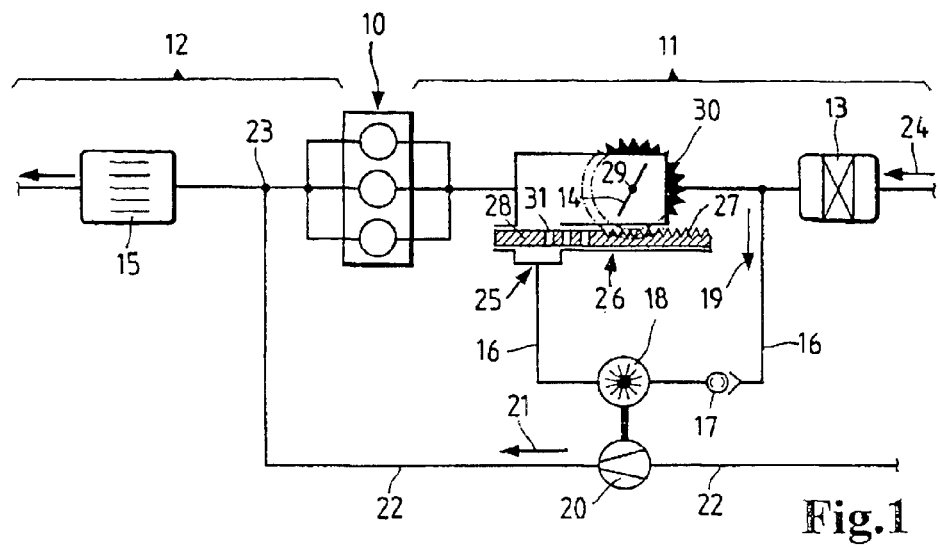

| | | | |
|---|---|---|---|
| 5,205,120 A | * 4/1993 | Oblander et al. | 60/307 |
| 6,094,909 A | 8/2000 | Weber et al. | 60/307 |
| 6,334,436 B1 | * 1/2002 | Paffrath et al. | 60/307 |

FOREIGN PATENT DOCUMENTS

| | | |
|---|---|---|
| DE | 4219267 | 12/1993 |
| DE | 19937781 | 2/2001 |
| GB | 1127193 | 9/1968 |
| WO | WO 97/38212 | 10/1997 |
| WO | 01/11208 | 2/2001 |

* cited by examiner

US 6,817,173 B2

METHOD AND DEVICE FOR SIMULTANEOUS REGULATION OF AN INTAKE AIR FLOW FOR AN INTERNAL COMBUSTION ENGINE AND A SECONDARY AIR FLOW IN THE EXHAUST SYSTEM OF THE SAME INTERNAL COMBUSTION ENGINE

STATE OF THE ART

The invention relates to a method and an internal combustion engine suitable for carrying out this method, in which an intake airflow for the internal combustion engine and a secondary airflow for injection into the exhaust system of the internal combustion engine are simultaneously adjusted with respect to the required mass flow.

Apparatus of the kind referred to above are known, e.g., from WO 97/38 212. According to FIG. 8 of this document a secondary air injection system for an internal combustion engine is presented, which consists of a turbine unit 114 and a compressor 113. The turbine is driven through a bypass duct which is arranged parallel to the throttle valve 115 in the air intake tract. In the bypass duct to the turbine there is furthermore disposed at least one throttling member 120. The simultaneous adjustment of the air intake stream and secondary air stream is performed by the interaction of throttle valve 115 and throttling member 120. Thus on the one hand the power of the turbine 114, and thus also the secondary air delivered by the compressor 113, can be adjusted, and on the other hand the delivered intake air stream can be adjusted as an addition of the air streams by the throttling member 120 and the throttle valve 115.

For the optimum adjustment of the two air streams the complex actions of the internal combustion engine must be known. On this basis the current air requirement in the intake tract of the internal combustion engine and in the exhaust system can be determined. The air requirement of the internal combustion engine is dependent, for example, on the load state, but also on the desired kind of operation, e.g., the combustion of the fuel with excess oxygen or oxygen deficiency. Secondary air is introduced into the exhaust system in the cold-start phase of the motor, for example. This is intended to oxidize incompletely burned exhaust components and to additionally heat by this exothermic reaction the catalyst that follows in the exhaust system. Thus, during the cold-start phase the pollutant discharge is reduced, and the cold-start phase is shortened, since the catalyst goes into action sooner due to the heating.

In the introduction of secondary air a certain air ratio must be established so that the emissions reduction will operate. In case of too much secondary air the exhaust gas is cooled too strongly without the oxidation of the additional exhaust components. In the case of too little secondary air not enough oxygen is available to oxidize the exhaust components.

One object of the invention is to provide a method that will enable a satisfactory adjustment of the secondary airflow and the intake airflow for the internal combustion engine by means of simple principles. A further object of the invention is to provide suitable devices for this method.

ADVANTAGES OF THE INVENTION

The method of the invention is appropriate in a known manner for the simultaneous adjustment of the intake air stream of the internal combustion engine and of the secondary air stream in the exhaust system of the internal combustion engine. The adjustment of the air streams is performed through a variation of the mass flow. In the air intake tract of the internal combustion engine a throttle valve is contained, the latter being able to affect only the mass flow of the intake air in the intake tract. When the intake air stream is adjusted, allowance must be made for the ambient air flow which is branched off to drive the turbine ahead of the throttle valve and to be returned to the intake tract behind the throttle valve. The turbine drives a compressor which produces the secondary air stream. The latter is fed to the exhaust system, and its injection ahead of the catalyst, for example, is desirable in order to achieve the previously described effects for the exhaust gas in the cold starting phase of the engine.

The invention is characterized in that at least when the internal combustion engine is idling the throttle valve assumes a position established for this state. This is done in view of the fact that, when the internal combustion engine is idling the need for air is known. By putting the throttle valve in a set position and putting the known air intake performance of the internal combustion engine at idle, it is thus possible simultaneously to achieve a defined turbine power. The throttle valve must be adjusted such that the air intake stream which sweeps past the throttle valve when added to the ambient air stream results in just the amount of air necessary for the idling of the internal combustion engine. In this way it can be brought about that, in this state of operation, the internal combustion engine runs with the required rotatory speed. Fluctuations in the amount of intake air delivered would result in an irregular speed of the internal combustion engine.

The valve position desirable for the idling speed, in relation to the air stream required for ordinary driving, must be determined for the internal combustion engine. For this purpose a throttling means can additionally be used, which is arranged in the bypass line and by means of which the air stream at the turbine can be influenced. The known conditions when the internal combustion engine is idling render unnecessary therefore a regulation or control of the rate of flow of the intake air. In this state of operation, slight departures from the intake air rate of flow that is actually desired are especially critical, since the internal combustion engine reacts to them immediately with a change in rpm. In other operating conditions, departures from the desired amounts of air intake and secondary air flows are of less importance. For these can be established in the bypass duct without providing any additional adjusting means such as the throttle valve and the throttling device as will be explained more precisely below. This has a positive effect on the economy of the proposed method, since additional regulating means become superfluous. The throttle valve setting can be operated, for example, through the motor control that is present anyway.

According to an additional embodiment of the invention, the established position of the throttle valve in the idling state is precisely when it is closed. In this case the air intake for the internal combustion engine is supplied exclusively through the bypass line. In that case the turbine can be used as the means for controlling the amount of intake air during idling. This becomes possible because the air throughput by the turbine is dependent upon the power consumed by the compressor, although in this case care must be taken that the compressor power is simultaneously affected by the mass flow of the secondary air.

According to an improvement of the invention, the throttle valve is to remain in the closed position as long as the required bypass air flow of the internal combustion engine is below the maximum possible at the turbine. Because this is the condition required that the air demand of the internal combustion engine can be covered exclusively through the bypass duct. In these circumstances of operation the maximum possible turbine power is always available. It can thus be converted to the greatest possible secondary air stream, which increases the possibilities for the variation of the amount of secondary air fed into the exhaust system.

If the turbine output is too great in the case of the complete closure of the throttle valve, to achieve a satisfactory setting of the secondary air flow, a throttle valve can be provided in the secondary air duct, according to a special embodiment of the invention. This permits reducing the secondary air flow whenever the mass of air being delivered is too great for the momentary state of operation of the internal combustion engine. This effect can advantageously also achieved by an additional duct which bypasses the compressor. This is made so as to be throttled and it can also be completely shut off. In the case of an opening, an air stream is produced in the additional duct which is opposed to the flow delivered by the compressor and while the compressor power remains the same it reduces the secondary air stream effectively delivered to the duct leading to the exhaust system.

The additional duct is especially able to reduce the secondary air stream independently of the turbine power. In this case it must be noted that the compressor output as well as the turbine output are coupled directly to one another. If the secondary air stream is reduced by a throttle in the secondary air duct, this will also result in a reduction of the throughput of air to the turbine. In case the internal combustion engine requires a greater amount of air, this must be offset by an adjustment of the throttle valve in the air intake tract. Thus it also appears that a throttle valve present in the secondary duct leads at the same time indirectly to a throttling of the admixed air to the turbine. In this case throttling of the secondary air stream can be dispensed with.

An internal combustion engine on which the method of the invention is to be carried out must at least have the following known components. It must be provided with an exhaust system with a catalyst, since the catalyst makes the secondary air supply necessary. A throttle valve must be present in the air intake tract of the internal combustion engine while a turbine is provided through a bypass line parallel to the throttle valve, which likewise can carry the intake air. The turbine is mechanically coupled to a compressor, so that the turbine power can be utilized as in a pumping power of the compressor for the introduction of the secondary air into the exhaust system [translation doubtful]. Furthermore, means must be provided for the performance of the already described process.

These means can consist, for example, of a throttle device which is arranged in the bypass duct and again is coupled mechanically with the throttle valve in the intake tract. By this mechanical coupling a fixed law is produced as to how the degrees of opening of the two throttle devices are related to one another. Especially, a linear relationship is achievable which allows for the circumstance that an increased need of air by the internal combustion engine requires a augmented supply of secondary air through an increased mass flow of the exhaust gas. The secondary air mass flow can thus be kept substantially constant. The throttle device for the bypass duct can consist, for example, of a sliding door which can be shifted back and forth in the wall of the air intake tract and in this manner control an opening connecting the bypass duct and the air intake tract. The sliding door can be continuously varied so that partial closing of the bypass line becomes possible. It is also conceivable that the sliding door have several passages through it which slide step-wise past the through opening, Also a plurality of connecting ports can be arranged, in which case the branching of the bypass line to the ports is necessary. The sliding door can be driven, for example, by a toothed rack mounted thereon. The mechanical coupling of the throttle valve is achieved, for example, by a toothed wheel which is mounted on the throttle valve shaft and meshes with the toothed rack.

With the embodiment described it is possible to establish especially a linear relationship between the throttle valve in the air intake tract and the throttle device in the bypass line. Of course, other drives are conceivable, which among other things can bring about also a degressive or progressive relationship between the throttle valve position and the throttle device position. Thus special air intake characteristics can be achieved in internal combustion engines, which in the individual case can be adapted to the given circumstances of the motor.

Another variant of the throttle means in the bypass duct is obtained by using a control valve for the throttling. This control valve communicates through a connecting line with the secondary air duct, so that the information on the compressor pressure applied in the secondary air duct can be fed into the valve through a control connection in the valve. The secondary air pressure can thus be used directly as a control variable in order, for example, to influence the turbine power by a corresponding adjustment of the control valve so that a constant secondary air pressure is formed. As soon as the secondary air pressure increases above the desired level, the control valve in the bypass duct is throttled, so that the turbine power decreases and with it the compressor power, which leads to a lower secondary air pressure. The control valve can also be designed such that any pressure pulsation in the secondary air duct or bypass duct is absorbed by damping factors which are associated with the design of the control valve.

In case of the use of the control valve described, its position depends only on the required secondary air pressure. In order at the same time to assure an optimum supply of intake air to the internal combustion engine the intake air stream must therefore be regulated by the position of the throttle valve. Another possibility is that control valves also control through the pressure present in the air intake tract, so that the latter, as a controlling factor, influences the action of the control valve in order to find a position constituting a compromise regarding the mass flow in the secondary air duct and in the intake duct of the internal combustion engine. In this case too, the marginal conditions of the internal combustion engine that is idling can be assumed to be known, so that the throttle valve assumes a position appropriate for this state of operation.

According to another embodiment of the invention, the method described in the beginning can be achieved by means of a control unit which has an input for a sensor in the secondary air duct, an input for a position sensor at the throttle valve and an output for a control signal for a control valve for controlling the secondary air volume. The sensor in the secondary air duct can be designed to detect the pressure present in the secondary air duct, or also the throughput of secondary air. The corresponding secondary air signal can be evaluated by the control and gives an indirect or direct information on the amount of secondary air delivered to the air intake tract. In modern internal combustion engines an indication of the position of the throttle valve is provided in order to achieve optimum motor control. This knowledge of its position can be used simultaneously by the control unit for the secondary air system in order to obtain indirect information on the amount of air that can be drawn from the air intake system. The position indication can be obtained, for example, by means of sensors such as potentiometers. If a stepper motor is used to drive the throttle valve, it supplies information at the same time on the throttle valve position, so that an additional sensor can be eliminated.

The input signals are used in order to produce an output signal in the control unit to control the position of the control valve. As already explained, due to the mechanical coupling of turbine and compressor it is possible to contain the control valve both in the bypass duct and in the secondary air duct. Increasing throttling of the control valve leads to a reduction of the secondary air stream as well as the secondary air stream.

By means of the information on the position of the control valve as well as the throttle valve it is possible to reach a conclusion as to the combustion air delivered to the internal combustion engine through the air intake tract.

The methods and apparatus heretofore described for the adjustment of the intake air and secondary air permit in various ways to estimate the processes really taking place in the internal combustion engine. With the estimate a control or regulation of the necessary secondary air as well as intake are described sufficiently accurately so that the expenditure for the adjustment of the air streams can be kept within limits. At the same time allowance is made for the main influence factor of the system. This influence factor is the throttle valve in the intake tract. As long as the latter is closed the entire air intake has to be carried through the bypass duct, which results in an excessively high turbine power. As soon as this air flow is no longer sufficient, the throttle valve in the air intake tract is opened, which results in an abrupt decrease of the turbine power. Under these conditions there is no longer any supply of secondary air to the exhaust system. The adjustability of the cross section of the bypass duct or secondary air duct leads, however, to an additional adjustability of the secondary air stream. Thus, if the throttle valve opens in the air intake tract, a reduction of the resistance to flow of the secondary air system can begin. Thus the loss of power at the turbine can be avoided or at least reduced since the mass flow in the bypass duct can be kept approximately constant due to the lowering of resistance to flow. The reduction of the resistance to flow is achieved, for example, through the previously described throttle devices in the secondary air duct or bypass duct.

If the adjustment mechanisms described should no longer suffice to assure the delivery of sufficient secondary air into the exhaust system, the feeding of fuel into the air intake tract can additionally be reduced. Thus the mixture becomes leaner, so that a thorough combustion can take place in the internal combustion engine. Therefore even in this case the exhaust levels of the internal combustion engine can remain compliant.

The secondary air system does not have to be controlled by a separate control unit. The functions can also be integrated into the motor control, thereby improving the economy of the proposed solution. In particular, various factors measured in the internal combustion engine are available for controlling the motor, and they do not have to be detected additionally. Other readings can additionally serve to refine the method for adjusting the secondary air system that has been described.

The fault-free operation of the secondary air system depends to a great extent also on the design of the individual components. The secondary air charger is to be designed such that, when the motor is idling, the necessary secondary air mass flow can be delivered by the compressor. Since the air requirement of the motor in this state of operation is slight, and this low amount of air must be maintained in order to reach the idling speed, the throttling of the turbine depends on these marginal conditions. If the compressor mass flow is too low in the case of turbines throttled in this way, the basic design of the secondary air charger, especially of the turbine must be revised. If the turbine is designed smaller, the throttling of the turbine can be reduced and the turbine pressure ratio increases. For the same turbine mass flow then more turbine power is produced and a greater compressor mass flow is required. The current level of the secondary air mass flow is detected by a sensor in the secondary air duct or in the exhaust system. In this case flow sensors, for example, can be used, and these must often be provided anyway in the exhaust system. For example, a comparison of the air throughput ahead of and behind the introduction of the secondary air would permit knowing the amount of secondary air delivered. Alternatively, a differential pressure at a known throttle point can also be evaluated. The required value of the secondary air mass flow can be determined, for example, by the motor control. In addition, the mass flow of engine air and fuel can be evaluated. The control unit, by applying the described method, adapts the secondary air mass flow to the desired level.

The method described is thus suitable in a special manner for regulating the mass flow of the secondary air flow. According to a special embodiment of the invention, the secondary air mass flow thus produced can be used for the internal combustion engine not just in the cold start phase. For this purpose the secondary air is fed to the exhaust system ahead of the catalyst. This can be done centrally, directly ahead of the catalyst or also in the exhaust passages of the cylinders. In a case where the secondary air is introduced near the cylinder outlet ports a better distribution of the secondary air in the exhaust gas is possible since the latter still has to travel a certain distance to the catalyst.

The secondary air, however, can also be introduced behind the catalyst. This possibility creates an additional application, wherein an adjusting means is provided which can select the delivery of the secondary air to the various inlets.

The application involving the delivery of secondary air behind the catalyst is used in the case of lean-fed internal combustion engines which are equipped with so-called storage catalyst systems for nitrogen oxides. These special catalysts are intended to keep the pollutant emission within the prescribed limits. They store up nitrogen oxides at leaner operating points and yield the nitrogen at rich operating points. The terms, lean and rich, refer to the states of operation in which more fuel or less fuel is admixed to the combustion mixture. In lean operation the fuel burns in the cylinders with excess air, while at the rich points of operation an excess of fuel is injected into the cylinders.

It is true that the sulfur originating from the fuel can limit the described action of the storage catalysts. This is caused by sulfur embedded in the catalyst, which can greatly reduce its running time.

Within certain limits the embedded sulfur, however, can be reversed. For that purpose the motor must be operated rich for a comparatively long time in minutes and at high exhaust gas temperatures. Thus a purification of embedded sulfates from the catalyst can be achieved, yet the carbon monoxide and hydrocarbon emission levels of the exhaust gas increase to unacceptable levels. By the introduction of secondary air downstream from the components to be desulfatized they can be burned, depending on the process, in the cold-start phase of the internal combustion engine. In this way a cleansing of the catalyst can be achieved at acceptable emission levels.

The described secondary air system can be used to produce the state of operation of the desulfatizing of the catalyst. In this case advantage can be taken of the circumstance that the conditions of the cold start and desulfatization never occur simultaneously. The cold-start phase amounts to only a few minutes after the motor is started. At the rich working points of the motor that are needed for desulfatizing the catalyst, the throttle valve in the air intake tract can be at least partially closed. Therefore a sufficient amount of circulated air can be made available to the turbine of the secondary air charger to make a sufficient amount of secondary air available by the compressor.

Of course, other secondary air systems which have, for example, an electrically driven compressor, can be used for the desulfatizing of the catalyst. In the design of the secondary air charger, care must be taken to see that it can supply the required amount of secondary air both in the cold-start phase and during the desulfatization. The secondary air charger must thus be designed for operation with the higher requirement of secondary air. The level of the secondary air requirement depends in the individual case on the internal combustion engine.

These and other features of preferred improvements of the invention will appear not only in the claims but also in the description and the drawings; the individual features each by itself or together in the form of sub-combinations in the embodiment of the invention and in other fields of activity, and can be realized in other fields and can represent advantageously a well as independently patentable embodiments, for which protection is here claimed.

THE DRAWINGS

Figure 2:
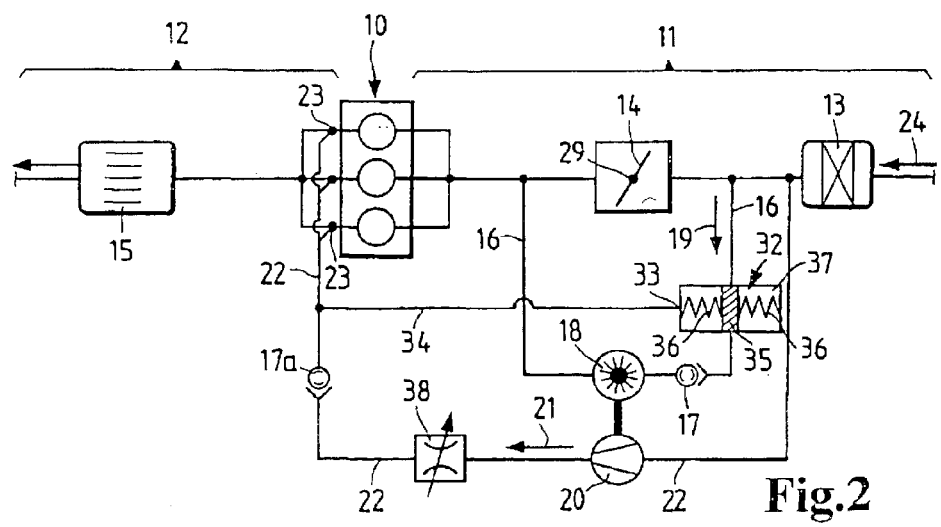
Figure 3:
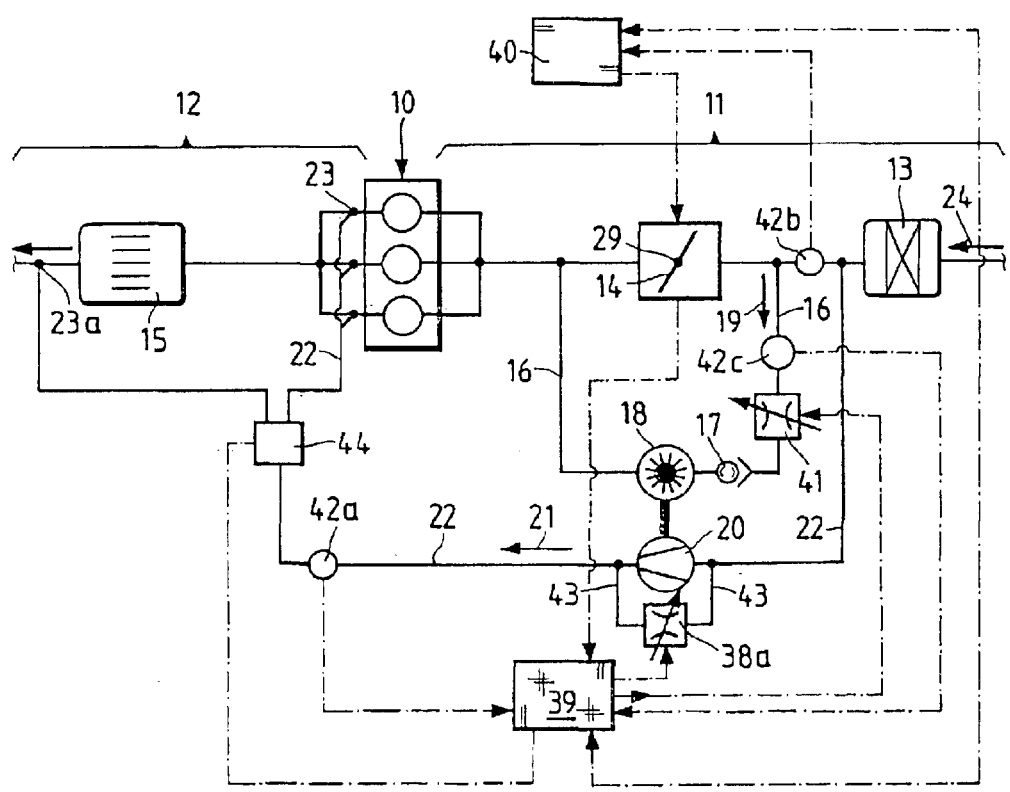

Additional details of the invention are described in the drawings with the aid of diagrammatic embodiments, namely FIG. 1 is a schematic representation of a secondary air system with mechanical coupling between the throttle valve in the air intake tract and a throttling device in the bypass duct, FIG. 2 is a schematic representation of a secondary air system with a control valve, and FIG. 3 is the schematic representation of a secondary air system with an electronically operated control valve in the bypass duct.

DESCRIPTION OF THE EMBODIMENTS

In FIG. 1 an embodiment is represented which can get by with a minimum expenditure on components. An internal combustion engine 10 is provided, which is equipped with an air intake tract 11 and an exhaust system 12. In the air intake tract there is at least one air filter 3 and a throttle valve 14. The exhaust system is equipped with a catalyst 15. Behind the air filter 13 and ahead of the throttle valve 14 a bypass duct 16 branches off which runs back to the air intake tract 11. In the bypass duct a check valve 17 is provided which prevents any flow of combustion air back through the bypass line. Furthermore, a turbine 18 is arranged in the bypass duct 16, which is driven by a bypass air flow 19. The turbine is mechanically coupled with a compressor 20 which pumps a secondary air flow 21 into a secondary duct 22. The secondary air duct leads into a feeder 23 of the exhaust system 12 ahead of the catalyzer 15. The directions of flow of an air intake stream 24 of the bypass air flow 19 and the secondary air stream 21 as well as of the exhaust gas are indicated by arrows along the lines.

The elements described thus far are found again in the embodiments in FIGS. 2 and 3, and are not explained again at this point.

The embodiment in FIG. 1 has a throttle device 25 for the bypass line 16 and is mechanically coupled to the throttle valve 14. This coupling is brought about by a rack-and-pinion drive 26, a rack 27 being made as part of a sliding door 28 and a valve shaft 29 of the throttle valve 14 is joined to a gear 30 which communicates with a gear 30, which is connected to the rack 27. When the throttle valve is turned, thus also the sliding door is moved, so that connecting ports 31 are opened and closed. These ports are in this embodiment made in the form of bores in the sliding door. Likewise conceivable is a port made in the form of an opening in the wall of the air intake tract, the sliding door sliding always over this port in order to close it continuously. This embodiment is not shown.

In the secondary air system in FIG. 2 a control valve 32 is arranged in the bypass duct 19. The control valve has a control connection 33 which is connected to the secondary air duct 22. Thus the control valve 32 is displaced depending on the pressure prevailing in the secondary air duct 22. At the same time a valve body 35 slides into the open cross section of the bypass duct, thereby directly affecting the bypass air flow 19. The stroke of the valve in relation to the pressure change in the secondary air flow 21 is determined by springs 36. Furthermore, a damping can be achieved in the control valve 32, which is determined by the damping properties of a fluid enclosed in a volume 37. To introduce the secondary air stream 21 into the exhaust system, several lines 23 are provided, which are situated directly behind the exhaust gas outlets at the end of the cylinders. In this manner an optimum mixing of the secondary air with the exhaust gases takes place. Furthermore, a throttle valve 38 is provided in the secondary air duct, by means of which the secondary air flow can be reduced or shut off. In the case of the present embodiment the secondary air is taken from the air intake tract of the internal combustion engine, behind the air filter 13. This assures that the secondary air will contain no impurities. Basically, however, the secondary air can also be aspirated out of the engine compartment, as this is indicated in FIG. 1.

In the embodiment according to FIG. 3, the secondary air system is equipped with a control unit 39 which communicates with a motor control 40. For the control of the valve, a set of curves can be deposited in the control unit 30 which permit the processing of different values measured in the secondary air system and motor. At least the throughput of the secondary air stream 21 is detected by means of a sensor 42*a* and the position of the throttle valve. Instead of the sensor 42*a*, a sensor 42*c* can also be provided which measures the air flow on the turbine side. Due to the mechanical coupling between compressor 20 and turbine 18 it is also possible to arrive at the secondary air flow. Furthermore, information on the motor control could have an influence, such as for example the rate of flow of combustion air in the air intake tract 11, measured by the sensor 42. The position of the throttle valve is frequently also deposited in the motor control, so that a separate measurement by the control unit does not have to be made.

The sensors used can also be flow sensors, for example, by means of which the volumetric flow of the air streams can be measured. Another possibility is the use of pressure sensor which, by measuring the pressure, permit an indirect judgment of the volumetric flow.

The control unit serves for the simultaneous operation of the control valve 41 and of a throttle valve 38a. The control valve governs the ambient air stream 19, while the throttle valves 38a is intended to regulate the effective secondary air stream. This is because the throttle valve is provided as an extra duct that forms a bypass for the compressor. Thus, by opening the choke valve 38a and feeding back the compressed air the effective secondary air stream can be regulated.

In addition to the ducts 23 for injecting secondary air, a duct 23a is provided which leads into the exhaust system behind the catalyst. By means of an actuator 44 the feed 23 or feed 23a can be connected or disconnected from the secondary air duct. Simultaneous connection of both feeds 23 and 23a is not anticipated. The duct 23a for the secondary air is intended for the state of operation of the desulfatizing of the catalyst 15.

What is claimed is:

1. In an internal combustion engine having an engine air intake tract with a throttle valve disposed therein and a bypass arranged parallel to said engine air intake tract with a turbine disposed therein, and having an exhaust system with a catalytic converter and a secondary air inlet for admitting secondary air into the exhaust system and a compressor driven by said turbine for introducing secondary air through said secondary air inlet, a method of simultaneously regulating a flow of engine air through said intake tract and bypass and a flow of secondary air into said exhaust system comprising adjusting the throttle valve to a defined idling position when the engine is idling.

2. A method according to claim 1, wherein said defined idling position of the throttle valve is a closed position.

3. A method according to claim 2, wherein the throttle valve is maintained in said closed position as long as the internal combustion engine requires less air than a maximum airflow possible through said bypass.

4. An internal combustion engine having an intake tract with a throttle valve disposed therein and an exhaust line with a catalytic converter disposed therein; wherein said intake tract further comprises a bypass for bypassing said throttle valve and a turbine disposed in said bypass so as to be driven by air passing through said bypass; wherein said exhaust line includes a secondary air inlet for introducing secondary air into engine exhaust in the exhaust line; wherein said turbine drives an air compressor having a compressed air outlet communicating with said secondary air inlet; and wherein means are provided for setting the throttle valve to a fixed idling position when the engine is idling so that airflow through the throttle valve and airflow through the bypass provide exactly an air quantity necessary for engine operation at idle and for desired turbine output, wherein said defined idling position of the throttle valve is a closed position, and said means for adjusting the throttle valve comprise a throttle member arranged in said bypass and mechanically coupled with said throttle valve.

5. An internal combustion engine having an intake tract with a throttle valve disposed therein and an exhaust line with a catalytic converter disposed therein; wherein said intake tract further comprises a bypass for bypassing said throttle valve and a turbine disposed in said bypass so as to be driven by air passing through said bypass; wherein said exhaust line includes a secondary air inlet for introducing secondary air into engine exhaust in the exhaust line; wherein said turbine drives an air compressor having a compressed air outlet communicating with said secondary air inlet; and wherein means are provided for setting the throttle valve to a fixed idling position when the engine is idling so that airflow through the throttle valve and airflow through the bypass provide exactly an air quantity necessary for engine operation at idle and for desired turbine output, wherein said throttle member comprises a slide diaphragm, which is arranged so as to displaceable over a connection opening between the intake tract and the bypass, whereby the connection opening can be opened and closed, and wherein said slide diaphragm is connected with the throttle valve via a rack-and-pinion drive.

6. An internal combustion engine having an intake tract with a throttle valve disposed therein and an exhaust line with a catalytic converter disposed therein; wherein said intake tract further comprises a bypass for bypassing said throttle valve and a turbine disposed in said bypass so as to be driven by air passing through said bypass; wherein said exhaust line includes a secondary air inlet for introducing secondary air into engine exhaust in the exhaust line; wherein said turbine drives an air compressor having a compressed air outlet communicating with said secondary air inlet; and wherein means are provided for setting the throttle valve to a fixed idling position when the engine is idling so that airflow through the throttle valve and airflow through the bypass provide exactly an air quantity necessary for engine operation at idle and for desired turbine output, the international combustion engine further comprising a regulating valve arranged in said bypass, wherein said regulating valve is equipped with a pneumatic regulating connection that communicates with the secondary air line via a connecting line.

7. An internal combustion engine having an intake tract with a throttle valve disposed therein and an exhaust line with a catalytic converter disposed therein; wherein said intake tract further comprises a bypass for bypassing said throttle valve and a turbine disposed in said bypass so as to be driven by air passing through said bypass; wherein said exhaust line includes a secondary air inlet for introducing secondary air into engine exhaust in the exhaust line; wherein said turbine drives an air compressor having a compressed air outlet communicating with said secondary air inlet; and wherein means are provided for setting the throttle valve to a fixed idling position when the engine is idling so that airflow through the throttle valve and airflow through the bypass provide exactly an air quantity necessary for engine operation at idle and for desired turbine output, the international combustion engine further comprising a control unit comprising:

an input for a secondary air signal provided by a sensor in the secondary air line or the exhaust system, an input for a position signal provided by a position sensor on the throttle valve, and an output for a control signal connected with a control valve arranged in the bypass or the secondary air line.

8. An internal combustion engine having an intake tract with a throttle valve disposed therein and an exhaust line with a catalytic converter disposed therein; wherein said intake tract further comprises a bypass for bypassing said throttle valve and a turbine disposed in said bypass so as to be driven by air passing through said bypass; wherein said exhaust line includes a secondary air inlet for introducing secondary air into engine exhaust in the exhaust line; wherein said turbine drives an air compressor having a compressed air outlet communicating with said secondary air inlet; and wherein means are provided for setting the throttle valve to a fixed idling position when the engine is idling so that airflow through the throttle valve and airflow through the bypass provide exactly an air quantity necessary for engine operation at idle and for desired turbine output, the international combustion engine further comprising a second throttle valve for regulating secondary airflow in the secondary air line.

9. An internal combustion engine having an intake tract with a throttle valve disposed therein and an exhaust line with a catalytic converter disposed therein; wherein said intake tract further comprises a bypass for bypassing said throttle valve and a turbine disposed in said bypass so as to be driven by air passing through said bypass; wherein said exhaust line includes a secondary air inlet for introducing secondary air into engine exhaust in the exhaust line; wherein said turbine drives an air compressor having a compressed air outlet communicating with said secondary air inlet; and wherein means are provided for setting the throttle valve to a fixed idling position when the engine is idling so that airflow through the throttle valve and airflow through the bypass provide exactly an air quantity necessary for engine operation at idle and for desired turbine output, the international combustion engine further comprising a secondary bypass line which bypasses the compressor and which can be throttled to regulate the secondary airflow in the secondary air line.

10. An internal combustion engine having an intake tract with a throttle valve disposed therein and an exhaust line with a catalytic converter disposed therein; wherein said intake tract further comprises a bypass for bypassing said throttle valve and a turbine disposed in said bypass so as to be driven by air passing through said bypass; wherein said exhaust line includes a secondary air inlet for introducing secondary air into engine exhaust in the exhaust line; wherein said turbine drives an air compressor having a compressed air outlet communicating with said secondary air inlet; and wherein means are provided for setting the throttle valve to a fixed idling position when the engine is idling so that airflow through the throttle valve and airflow through the bypass provide exactly an air quantity necessary for engine operation at idle and for desired turbine output, wherein said secondary air inlet is arranged upstream of the catalytic converter, and a further air inlet into the exhaust line is provided downstream of the catalytic converter, and wherein a control unit is provided for regulating admission of secondary air through said secondary air inlet and through said further air inlet.

* * * * *